Patented June 25, 1946

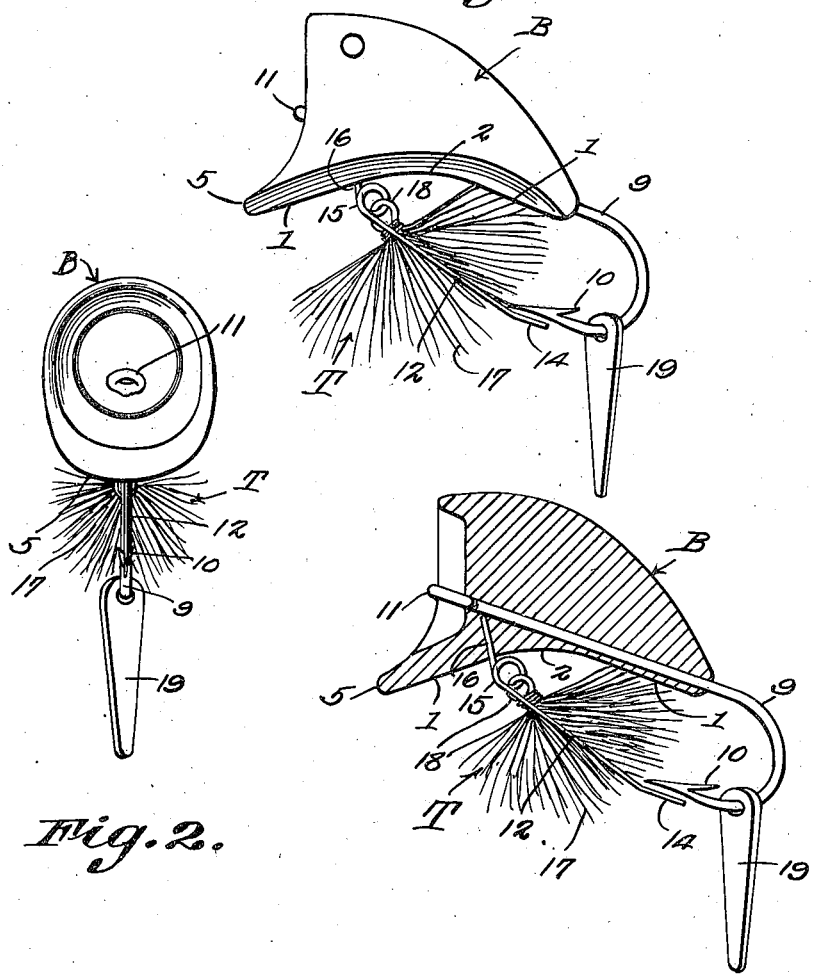

2,402,853

UNITED STATES PATENT OFFICE 2,402,853

FISHING LURE

Floyd D. Sweeney, Fresno, Calif.

Application October 16, 1943, Serial No. 506,581

1 Claim. (Cl. 43—39)

The device forming the subject matter of this application is a fishing lure, and one object of the invention is to provide novel means whereby a tail may be detachably but securely assembled with the body portion of the lure. Another object of the invention is so to construct and mount the tail, relatively to a hook on the rear end of the body of the lure, that the tail will serve, to some extent, as a weed guard. Another object of the invention is to provide a novel weed guard proper, upon which the tail may be mounted securely but releasably, the tail supplementing the weed guard in the deflection of weeds and other floating material.

In the drawing:

Fig. 1 shows in side elevation, a fish lure constructed in accordance with the invention;

Fig. 2 is a rear end elevation;

Fig. 3 is a longitudinal section wherein parts remain in elevation.

The fishing lure forming the subject matter of this application is adapted to be made in small size, for fly rod fishing, although it may be made in a larger size for casting, if it is desired that, when the lure is operated, there shall be a "plunk" or disturbance of the surface of the water.

The lure comprises a buoyant body B, colored or decorated as desired, and made of any chosen material, a plastic being preferred, although wood, cork or the like may be employed. The body B has a forwardly-presented lip 5. In cross section, as shown in Fig. 2, the body B approaches closely a circular form but has a slight tendency to oblateness at its sides, without having, at those places, a distinct flatness. As in my Patent 2,314,907, the lower edge of the body, longitudinally considered, comprises straight end portions 1, connected by a continuous upper curve 2.

A hook 9 is assembled with the body B in any desired way. Preferably, the shank of the hook extends entirely through the body B, longitudinally, near the lower surface of the body. The barb 10 of the hook is located directly beneath the rear end of the body B. At its forward end, the shank of the hook 9 terminates in an eye or attaching device 11.

The numeral 12 designates a rearwardly and downwardly inclined weed guard, preferably in the form of a piece of resilient wire terminated at its rear end in an obtusely disposed finger 14, located slightly below the barb 10 of the hook 9. The resiliency of the weed guard 12 is such that it does not prevent a fish from being impaled on the barb 10 of the hook 9, but the weed guard and its finger 14 will serve to direct floating material clear of the hook.

Close to the lower edge of the body 1, the weed guard 12 is bent upon itself, spirally, to form a backwardly projecting loop 15. The loop 15 terminates in a short, upwardly extended arm 16, retained and held in the body B, the specific way of anchoring the arm in the body depending upon the constituent material of the body. The loop 15 tends to close together laterally, but it may be opened laterally by force, as hereinafter explained.

The device includes a part which may conveniently be called a tail T. The tail T may be made of any chosen material, such as transversely separated and somewhat stiff but resilient hair 17. Out of the water, the mass 17 of hair is of approximately hemispheral form, but, when the lure is drawn through the water, the mass of hair assumes a somewhat conical form, and, being located in front of the barb 10 of the hook 9, serves to some extent as an attraction for the fish. In any event, the tail T supplements the action of the weed guard 12 in dispersing weeds and preventing them from fouling the bend and barb of the hook 9. The numeral 18 refers to an attaching device, such as a rigid eye, made fast to the forward end of the hair or main portion of the tail T.

The eye 18 of the tail T can be slipped forwardly along the weed guard 12 and be engaged, pivotally, within the eye 18. Although the mounting of the tail T in the loop 15 is easily accomplished at the will of an operator, the tail T will remain securely assembled with the eye 18, since the eye tends to close together transversely. There is no likelihood of the loss of the tail. The tail T is connected to the body B at a place a little ahead of the central portion of the lower edge of the body and tends to represent the legs of a small bait. Since the tail T is not located at the extreme rear end of the body B, the tail does not interfere seriously with the oscillating forward movement of the lure. If the operator does not wish to employ the weed guard 12, he can clip it off, immediately to the rear of the loop 15.

A spinner 19, preferably made of rigid material, is pivotally mounted on the bend of the hook 9.

The lure will dive, move on the surface and attract fish. The conduct of the lure depends upon the pull on the line (not shown) which is assembled with the eye 11.

The lure is cast by means of a fly rod, and alights on the water with a minimum disturbance. It is permitted to rest there a few seconds, whereupon, with a sharp, downward flip of the rod, the lure is jerked on the surface of the water. When the lure is jerked, the lip 5 engages the water and causes the lure to up-end and dive.

The foregoing operation is repeated at intervals, with an occasional retrieve of the lure for a foot or two. Whilst the lure is being retrieved, it has an oscillating or swimming movement on the surface of the water, and leaves a wake which has the appearance of something alive and swimming on the surface of the water. The swimming feature is produced largely by the action of the lip 5, but the lower-edge construction 1—2, and the general form of the body B, contribute.

Having thus described the invention, what is claimed is:

A fishing lure comprising a body having a lower upwardly curved bottom, a hook carried by the rear portion of the body and having a forwardly presented barb, a weed guard comprising a length of wire material formed with a normally closed loop disposed adjacent to the forward end thereof, the forward end of the guard being extended upwardly and being secured within an opening formed in the lower surface of the body, the loop lying within the curved bottom of the body, the rear end of the guard extending rearwardly into weed-deflecting relation with the hook, and a tail attached within the loop for pivotal movement with respect to the guard.

FLOYD D. SWEENEY.